(12) United States Patent
Tsujimoto et al.

(10) Patent No.: US 7,173,202 B2
(45) Date of Patent: Feb. 6, 2007

(54) HORN SWITCH DEVICE, AIRBAG SYSTEM, AND STEERING WHEEL

(75) Inventors: Kei Tsujimoto, Tokyo (JP); Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/293,175

(22) Filed: Dec. 5, 2005

(65) Prior Publication Data

US 2006/0128187 A1 Jun. 15, 2006

(30) Foreign Application Priority Data

| Dec. 10, 2004 | (JP) | ............................. 2004-358574 |
| Jan. 19, 2005 | (JP) | ............................. 2005-011773 |
| Jun. 23, 2005 | (JP) | ............................. 2005-183677 |
| Nov. 25, 2005 | (JP) | ............................. 2005-340561 |

(51) Int. Cl.
*H01H 9/00* (2006.01)

(52) U.S. Cl. ............................. 200/61.54; 200/61.55; 280/731

(58) Field of Classification Search .. 200/61.54–61.57; 280/731, 728.2; 74/552
See application file for complete search history.

(56) References Cited

U.S. PATENT DOCUMENTS

| 5,327,796 | A | * | 7/1994 | Ernst et al. ............... 74/484 H |
| 5,410,114 | A | | 4/1995 | Furuie et al. |
| 5,593,178 | A | * | 1/1997 | Shiga et al. ............... 280/731 |
| 5,627,352 | A | * | 5/1997 | Suzuki et al. ............ 200/61.54 |
| 6,478,330 | B2 | | 11/2002 | Fujita |
| 6,508,485 | B2 | | 1/2003 | Kikuta et al. |
| 6,616,181 | B1 | * | 9/2003 | Ford ........................... 280/731 |
| 6,719,323 | B2 | | 4/2004 | Kai et al. |
| 6,871,870 | B2 | * | 3/2005 | Schneider et al. ........ 280/728.2 |
| 6,881,911 | B2 | * | 4/2005 | Sugimoto ................. 200/61.54 |
| 6,995,328 | B2 | * | 2/2006 | Sugimoto ................. 200/61.54 |
| 2002/0153714 | A1 | | 10/2002 | Kreuzer |
| 2004/0046367 | A1 | | 3/2004 | Schneider et al. |
| 2005/0012311 | A1 | | 1/2005 | Schneider et al. |

FOREIGN PATENT DOCUMENTS

| JP | 10100832 A | 4/1998 |
| JP | 11278280 A | 10/1999 |
| JP | 2001187576 A | 7/2001 |
| JP | 2001199300 A | 7/2001 |
| JP | 2001213326 A | 8/2001 |
| JP | 2001233159 A | 8/2001 |
| JP | 2001277976 A | 10/2001 |
| JP | 2001278060 A | 10/2001 |

* cited by examiner

*Primary Examiner*—Michael A. Friedhofer
(74) *Attorney, Agent, or Firm*—Manabu Kanesaka

(57) ABSTRACT

A horn switch device includes a first contact member, a second contact member disposed relative to the first contact member via a spacer, a guide shaft for guiding the first and second contact members, a coil spring, and a contacting body at the distal end of an extension extending from a retainer. When a module cover is depressed, the second contact member comes into contact with the contacting body so as to be deformed, thereby bringing electrical contacts into contact with each other so as to sound the horn. The horn switch device facilitates positioning of the contacts relative to each other, thereby simplifying the assembly of an airbag system.

18 Claims, 12 Drawing Sheets

HORN SWITCH DEVICE, AIRBAG SYSTEM, AND STEERING WHEEL

BACKGROUND OF THE INVENTION AND RELATED ART STATEMENT

The present invention relates to a horn switch, and in particular, it relates to a horn switch device provided in an airbag system and constructed such that, when depressed, a module cover is retracted to turn on a horn switch. The invention also relates to an airbag system and a steering wheel including the horn switch device.

Driver-seat airbag systems mounted to car steering wheels are disclosed in which, when the module covers of the airbag systems are depressed, horn switches are turned on to sound horns. Japanese Unexamined Patent Application Publication No. 10-100832 and Japanese Unexamined Patent Application Publication No. 2001-114057 describe airbag systems in which, when depressed, a module cover is retracted to turn on a horn switch.

In the related-art horn switch devices, one of the contact members is mounted to the module cover, and the other is mounted to a retainer. The separate contact members increase the difficulty associated with assembly work to position the contact members with high accuracy.

Accordingly, it is an object of the present invention to provide a horn switch device in which a pair of contact members is provided only on one of a retractable body such as a module cover and an unmoving body such as a retainer or a steering wheel. Thus, the contact members can easily be positioned. It is also an object of the present invention to provide an airbag system and a steering wheel including the horn switch device. Further objects and advantages of the invention will be apparent from the following description of the invention and the associated drawings.

SUMMARY OF THE INVENTION

A horn switch device according to a first embodiment of the invention includes a retractable body that is retracted by depression by an occupant; an unmoving body that faces the retractable body; a biasing member interposed between the retractable body and the unmoving body, for biasing the retractable body in the restoring direction; and a pair of contact members whose contacts come into or out of contact with each other by the movement of the retractable body. Both of the pair of contact members move together with the retractable body. The unmoving body has a contacting body that comes into contact with one of the contact members when the retractable body retracts, to deform the contact member toward the other contact member, thereby bringing the contacts into contact with each other.

A horn switch device according to a second embodiment of the invention includes a retractable body that is retracted by depression by an occupant; an unmoving body that faces the retractable body; a biasing member interposed between the retractable body and the unmoving body, for biasing the retractable body in the restoring direction; and a pair of contact members whose contacts come into or out of contact with each other by the movement of the retractable body. Both of the pair of contact members are held by the unmoving body. The retractable body has a contacting body that comes into contact with one of the contact members when the retractable body retracts, to deform the contact member toward the other contact member, thereby bringing the contacts into contact with each other.

A horn switch device according to a third embodiment of the invention includes a retractable body that is retracted by depression by an occupant; an unmoving body that faces the retractable body; a biasing member interposed between the retractable body and the unmoving body, for biasing the retractable body in the restoring direction; and a pair of contact members whose contacts come into or out of contact with each other by the movement of the retractable body. Both of the pair of contact members move together with the retractable body. The contacts are in contact with each other when the retractable body is in a restored position. A contacting body is provided which comes into contact with one of the contact members when the retractable body retracts, to deform the contact member so as to be separated from the other contact member, thereby separating the contacts from each other.

A horn switch device according to a fourth embodiment of the invention includes a retractable body that is retracted by depression by an occupant; an unmoving body that faces the retractable body; a biasing member interposed between the retractable body and the unmoving body, for biasing the retractable body in the restoring direction; and a pair of contact members whose contacts come into or out of contact with each other by the movement of the retractable body. Both of the pair of contact members are held by the unmoving body. The contacts are in contact with each other when the retractable body is in a restored position. A contacting body is provided which comes into contact with one of the contact members when the retractable body retracts, to deform the contact member so as to be separated from the other contact member, thereby separating the contacts from each other.

According to one configuration of the first, second, third, and fourth embodiments of the horn switch device, the retractable body is the module cover of an airbag system.

According to one embodiment of the horn switch device in which the retractable body is the module cover of an airbag system, the unmoving body is a member extending from the retainer of the airbag system.

According to another configuration of the first, second, third, and fourth embodiments of the horn switch device, the retractable body is an airbag system.

According to one embodiment of the horn switch device in which the retractable body is an airbag system, the unmoving body is a steering wheel or a member extending from the steering wheel.

In another embodiment of the invention, an airbag system includes a horn switch device according to one of the first, second, third, and fourth embodiments of the invention. In another embodiment of the invention, a steering wheel includes a horn switch device according to one of the first, second, third, and fourth embodiments of the invention.

In still another embodiment of the invention, a steering wheel is equipped with an airbag system that includes a horn switch device according to one of the first, second, third, and fourth embodiments of the invention.

Advantages of the invention include the following. In the horn switch device according to the first or the second embodiment of the invention, the contact members are apart from each other when the retractable body such as a module cover or an airbag system is in a restored position (undepressed state). When the retractable body is depressed, one of the contact members is pushed by the contacting body to be deformed toward the other contact member, so that the contacts come into contact with each other to sound the horn.

In the horn switch device according to the third or the fourth embodiment of the invention, the contacts are in contact with each other when the retractable body such as a module cover or an airbag is in a restored position. The horn control circuit is constructed not to energize the horn when the contacts are in close position.

When the retractable body retracts, the contacting body pushes one of the contact members, so that the contact member is deformed to be separated from the other contact member, separating the contacts from each other into open position. The horn control circuit thus energizes the horn to sound it.

In both of the horn switch devices, the contact members are provided to only one of the retractable body and the unmoving body. Accordingly, the contact members can easily be positioned, improving the workability in assembling the airbag system, the steering wheel, etc.

In the invention, the retractable body may be either a module cover or an airbag system. When the retractable body is a module cover, the unmoving body is preferably a member extending from a retainer; when the retractable body is an airbag system, the unmoving member is preferably a steering wheel or a member extending from the steering wheel.

DETAILED DESCRIPTION OF THE PREFERRED EMBODIMENTS

Embodiments of the present invention will be specifically described hereinafter with reference to the drawings.

Figure 1:
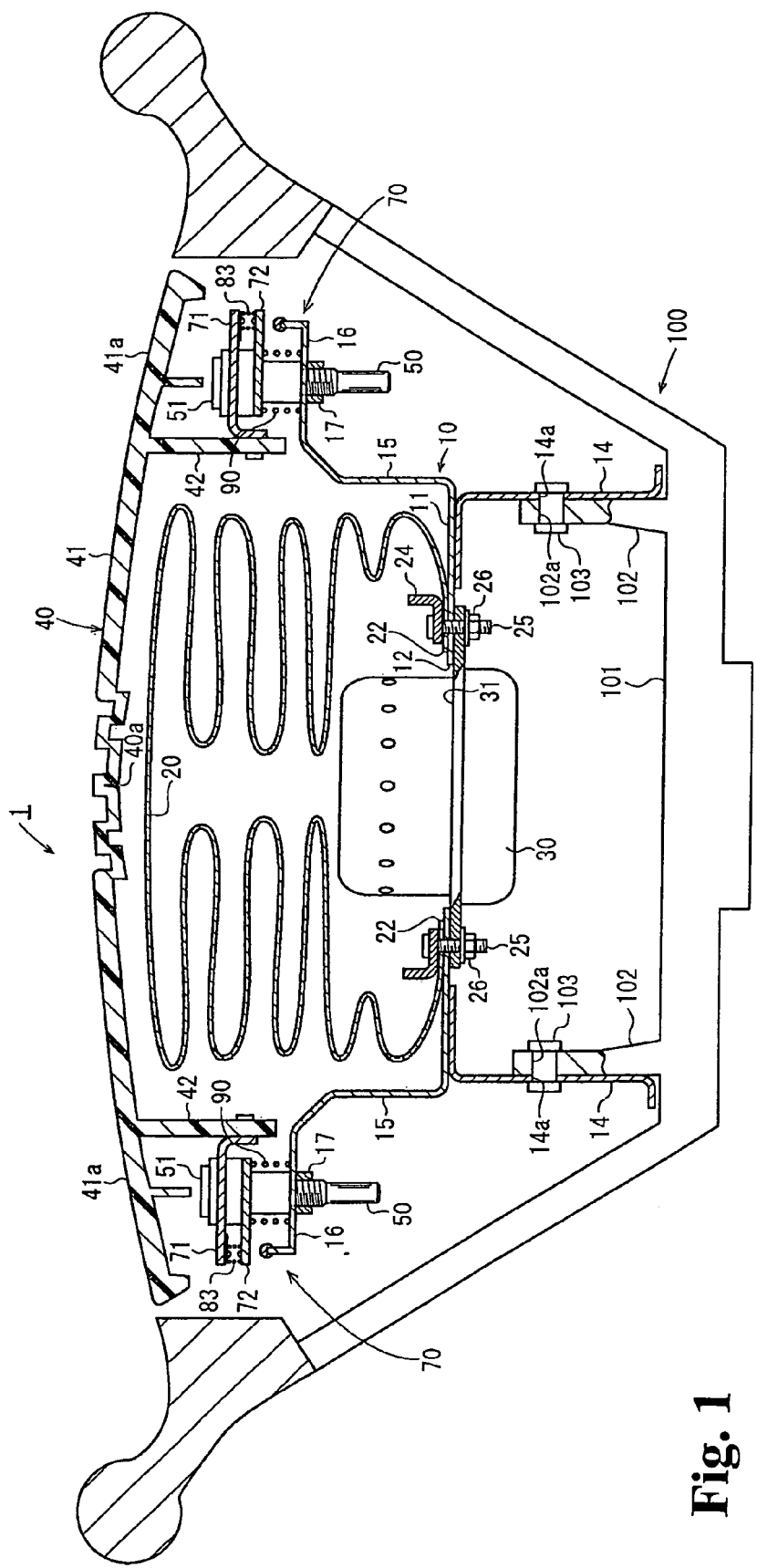
FIG. 1 is a cross-sectional view of a steering wheel equipped with an airbag system including a horn switch device according to a first embodiment of the present invention.
Figure 2A:
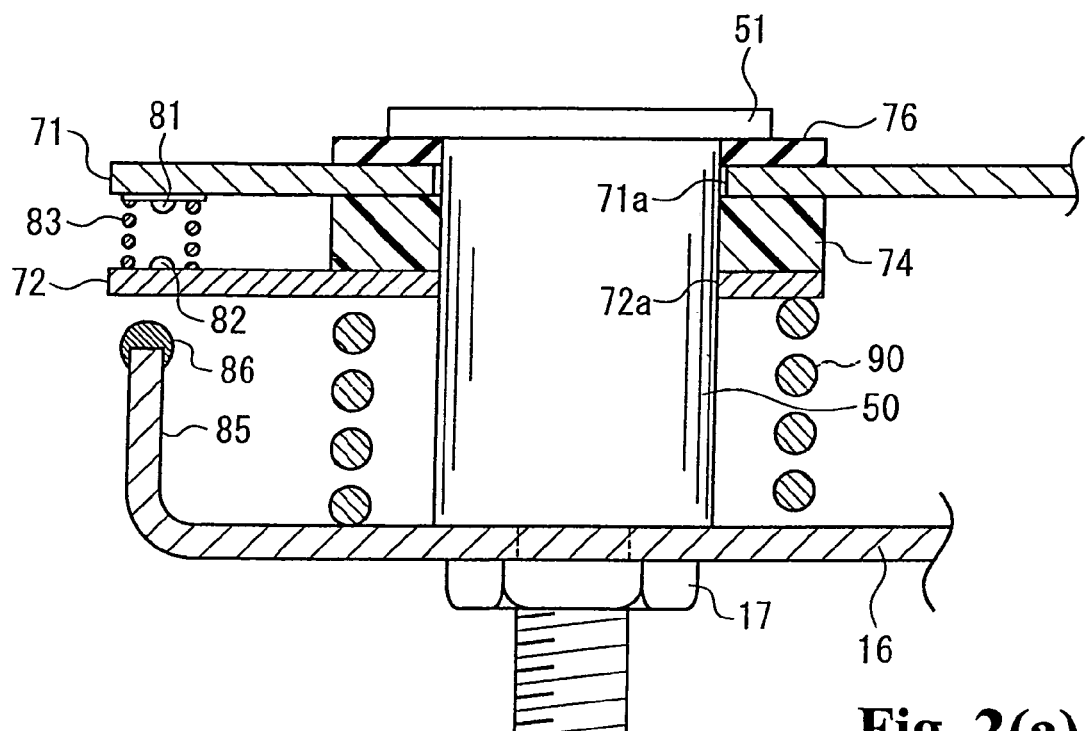
FIGS. 2(a) and 2(b) are cross-sectional views of the horn switch device illustrated in FIG. 1.
Figure 2B:
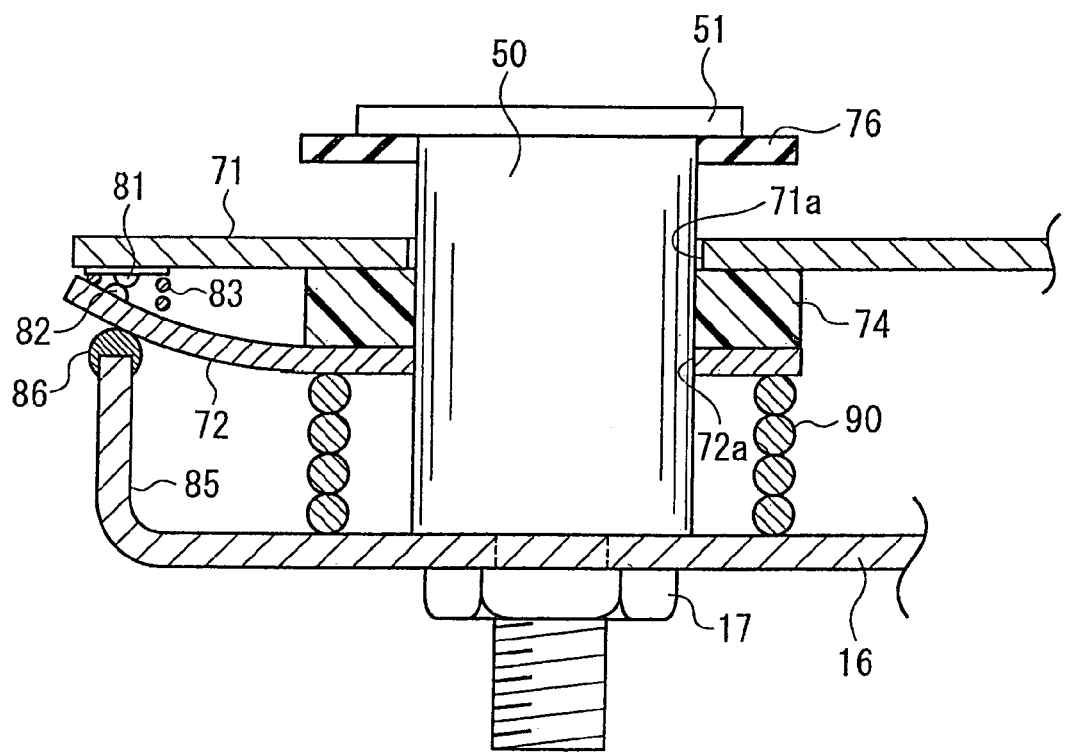

FIG. 1 is a cross-sectional view of a steering wheel equipped with an airbag system including a horn switch device according to a first embodiment of the present invention. FIGS. 2(a) and 2(b) are enlarged views of the horn switch device illustrated in FIG. 1. FIG. 2(a) shows "an undepressed" state in which a module cover 40 is not depressed, and FIG. 2(b) shows "a module-cover depressed state" in which the module cover 40 is depressed to sound a horn.

The airbag system 1 is a driver-seat airbag system disposed in the center (a base 101) of a steering wheel 100. The airbag system 1 includes a metal retainer 10, an airbag 20 mounted to the retainer 10 with an airbag-fixing ring 24, an inflator 30 for inflating the airbag 20, a synthetic-resin module cover 40 that covers the folded airbag 20, a horn switch device 70, etc. The retainer 10 may not be made of metal but may be made of resin, magnesium alloys, etc.

According to the first embodiment, the module cover 40 is a moving body. The module cover 40 has a groove-like tear line 40a. When the airbag 20 is inflated by the inflator 30, the module cover 40 is cleaved along the tear line 40a.

The retainer 10 has a substantially rectangular main plate 11. The main plate 11 has an opening 12 for the inflator 30 to pass through. Around the opening 12 are provided through holes for stud bolts 25 standing from the airbag-fixing ring 24.

An anchor piece 14 extends downward (i.e., in FIG. 1, in the direction opposite to the occupant of the vehicle) from the outer rim of the main plate 11 of the retainer 10. The anchor piece 14 is used to fix the airbag system 1 to the steering wheel 100. The anchor piece 14 has openings 14a for bolts or rivets to pass through. The steering wheel 100 has an airbag-system mounting piece 102 rising from the base 101 thereof. The mounting piece 102 also has an opening 102a for a bolt or a rivet to pass through.

In mounting the airbag system 1 to the steering wheel 100, the anchor piece 14 is placed on the mounting piece 102, and they are joined with a bolt or a rivet 103 through the openings 14a and 102a. The openings 14a and 102a may be screw sections for bolts.

An enclosure 15 extends upward (i.e., in FIG. 1, toward the vehicle occupant) from the outer rim of the main plate 11 of the retainer 10. An extension 16 extends laterally (to the side of the airbag system 1) from the distal end of the enclosure 15 in the standing direction. In this embodiment, the extension 16 is an unmoving body.

To the extension 16 is fixed a nut 17, to which the lower end of a guide shaft 50 is screwed.

The airbag 20 has a structure in which the periphery of an inflator insertion hole 22 thereof is placed on the periphery of the inflator opening 12 of the retainer main plate 11, on which the airbag-fixing ring 24 is placed. The stud bolts 25 are passed through the bolt insertion holes provided around the inflator insertion hole 22 of the airbag 20. Each stud bolt 25 is then passed through a bolt insertion hole of the retainer 10. The stud bolt 25 is then passed through a bolt insertion hole of a flange 31 of the inflator 30, on which a nut 26 is tightened. The airbag 20 and the inflator 30 are thus fixed to the retainer 10.

The module cover 40 has a main surface 41 that faces the occupant and a leg 42 extending from the back of the main surface 41. The leg 42 is molded integrally with the main surface 41 by injection molding of synthetic resin and has a substantially rectangular frame shape similar to the enclosure 15 of the retainer 10. The periphery 41a of the main surface 41 overhangs outward from the leg 42.

The leg 42 mounts a first contact member 71 that is part of the horn switch device 70.

The first contact member 71 is in the form of an L-shape, whose base end is fixed to the leg 42 with a fixing member such as a rivet and whose distal end extends outward in the direction perpendicular to the direction in which the module cover 40 retracts.

A second contact member 72 is disposed via an electrical insulating spacer 74 with respect to the first contact member 71. The second contact member 72 has a flat shape, whose distal end extends outward relative to the spacer 74. The distal end of the first contact member 71 also extends outward relative to the spacer 74.

The first and second contact members 71 and 72 have insertion holes 71a and 72a for the guide shaft 50, respectively.

As shown in FIGS. 2(a) and 2(b), the lower end of the guide shaft 50 is screwed into the nut 17 of the extension 16 to be fixed to the extension 16 and extends from the extension 16 toward the occupant. A flange 51 is provided as a stopper at the upper end of the guide shaft 50. Between the flange 51 and the first contact member 71 is interposed a washer 76 made of an electrical insulation member such as rubber.

A coil spring 90 is provided between the second contact member 72 and the extension 16 while having a reserve of energy. The biasing force of the coil spring 90 pushes the washer 76, the first contact member 71, the spacer 74, and the second contact member 72 against the flange 51.

Contacts 81 and 82 are provided on the opposing faces of the distal ends of the first and second contact members 71 and 72, respectively. Between the distal ends of the first and second contact members 71 and 72 is provided a spring 83.

The distal end of the extension 16 rises upward (i.e., toward the occupant), and serves as a contacting body 85. At the upper end of the contacting body 85, a cushion 86 made of rubber, synthetic resin, or the like is provided.

The horn-sounding action of the steering wheel 100 equipped with the airbag system 1 including this horn switch device 70 will now be described.

As shown in FIG. 2(a), before the module cover 40 is depressed, the second contact member 72 is apart from the contacting body 85, and the first and second contact members 71 and 72 extend substantially in parallel, so that the contacts 81 and 82 are apart from each other. The second contact member 72 is pushed against the first contact member 71 via the spacer 74 by the coil spring 90.

When the module cover 40 is depressed, the first and second contact members 71 and 72 and the spacer 74 fall together. With the falling, the coil spring 90 is compressed.

The extension 16 extends from the retainer 10 fixed to the steering wheel 100, so that it is not displaced even if the module cover 40 is depressed. Also the guide shaft 50 fixed to the extension 16 is not displaced.

As the first and second contact members 71 and 72 and the spacer 74 are pushed down, the distal end of the second contact member 72 is brought into contact with the contacting body 85 to be deformed such that it comes close to the first contact member 71, thus bringing the contacts 81 and 82 at the first and second contact members 71 and 72 into contact with each other. Thus, the horn switch device 70 is turned on to sound the horn.

On release from the module cover 40, the first and second contact members 71 and 72 and the module cover 40 are pushed up by the repulsive force of the coil spring 90 into the state shown in FIG. 2(a). The distal ends of the contact members 71 and 72 are pushed open by the repulsive force of the spring 83. This opens the contacts 81 and 82 to stop sounding the horn.

In this horn switch device 70, as described above, both of the first and second contact members 71 and 72 are mounted to or supported by the module cover 40, so that they can be positioned easily and accurately. This reduces the difficulty in assembling the horn switch device 70 or the airbag system 1.

Figure 3:
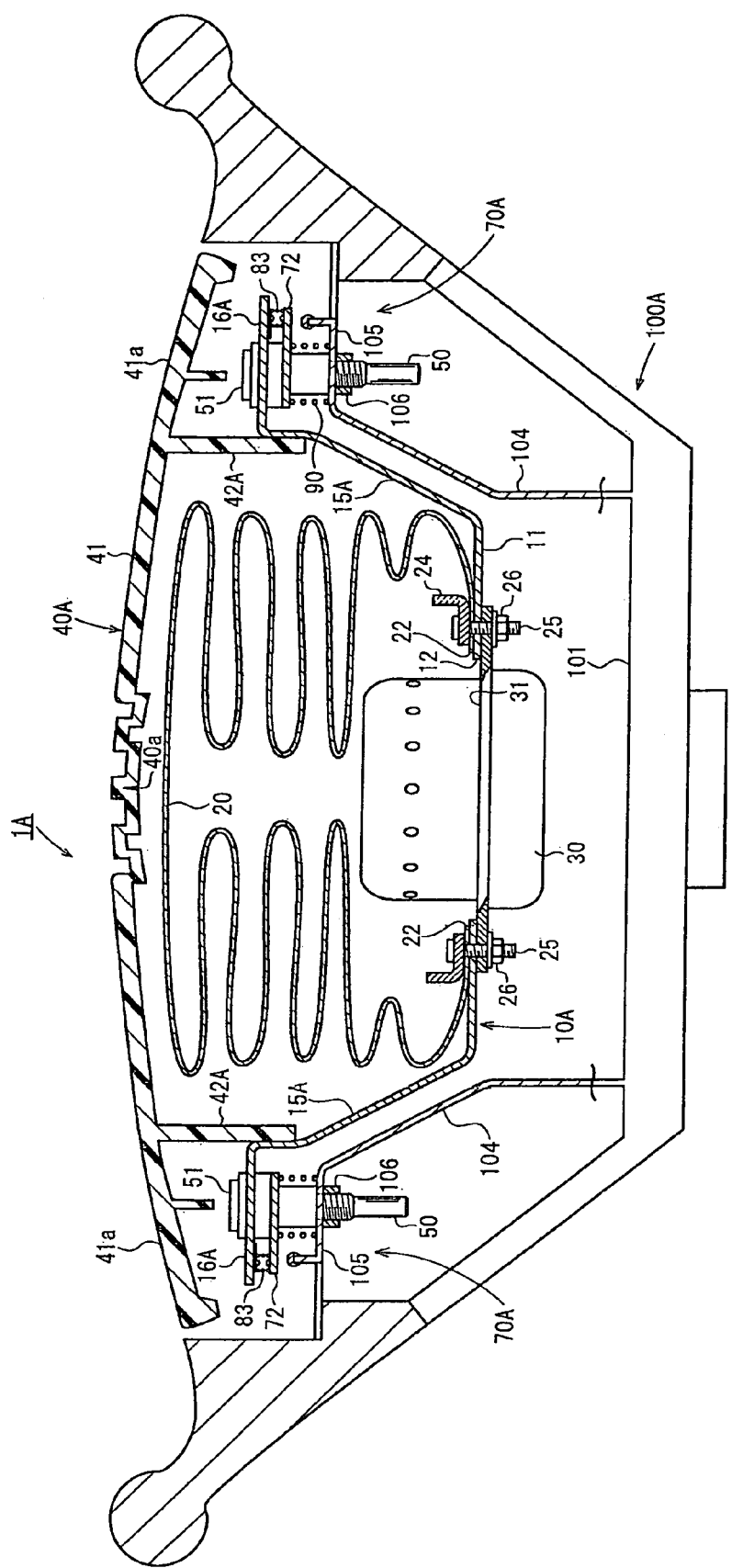
FIG. 3 is a cross-sectional view of a steering wheel equipped with an airbag system including a horn switch device according to another embodiment of the present invention.
Figure 4A:
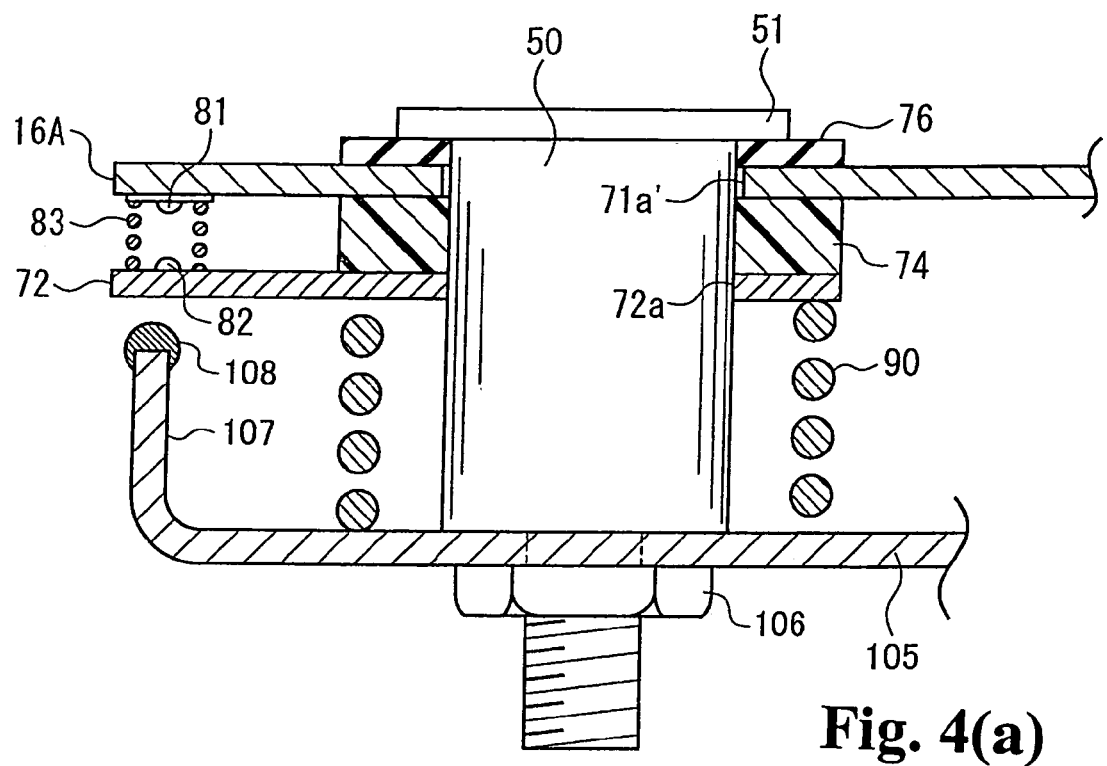
FIGS. 4(a) and 4(b) are cross-sectional views of the horn switch device illustrated in FIG. 3.
Figure 4B:
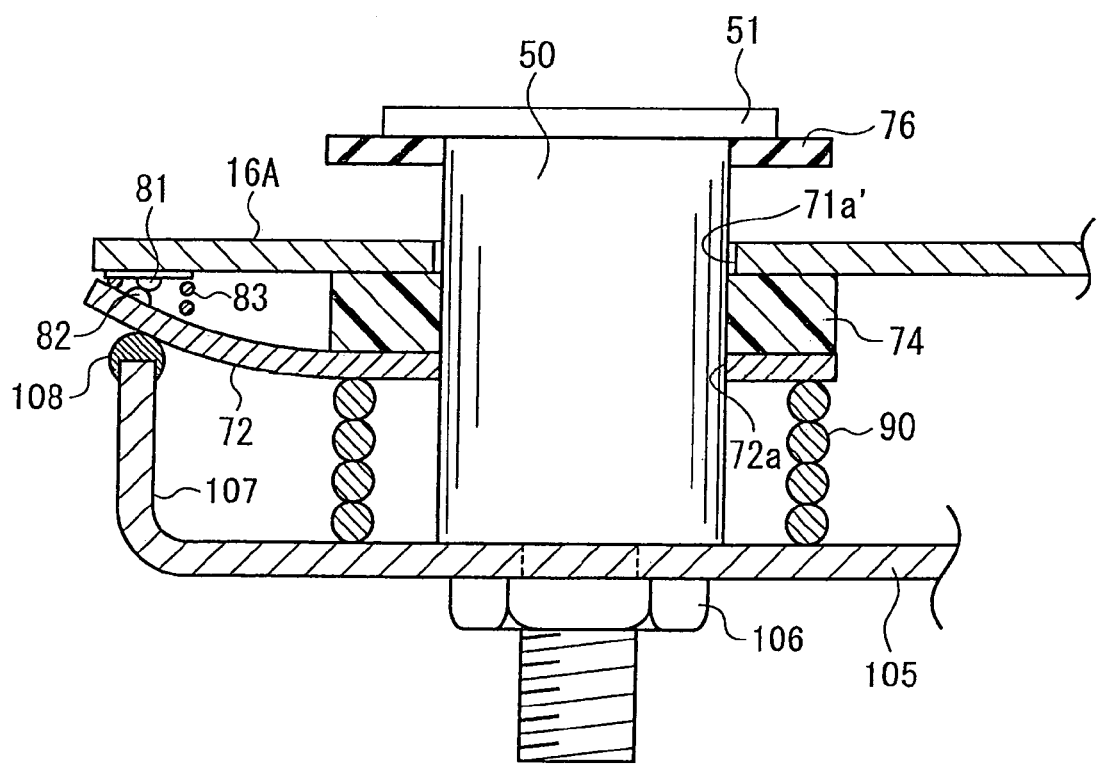

While the first embodiment has a structure in which only the module cover is retracted by depression, according to a second embodiment, the invention can also be applied to an airbag system in which the module cover and the retainer move vertically together. FIG. 3 is a cross-sectional view of a steering wheel 100A equipped with an airbag system 1A with a structure according to the second embodiment. FIGS. 4(a) and 4(b) are enlarged views of the horn switch device in FIG. 3. FIG. 4(a) shows "an undepressed" state in which a module cover is not depressed, and FIG. 4(b) shows "a module-cover depressed state" in which the module cover is depressed to sound a horn.

This airbag system 1A also includes a retainer 10A, an airbag 20 mounted to the retainer 10A with a ring 24, an inflator 30 for inflating the airbag 20, a module cover 40A that covers the folded airbag 20, a horn switch device 70A, etc. According to this embodiment, the entire airbag system 1A constructs a retractable body.

The retainer 10A of this embodiment also has a substantially rectangular main plate 11. The airbag 20 and the inflator 30 are mounted to the main plate 11, whose mounting structure is the same as that of the airbag system 1 in FIG. 1.

An enclosure 15A extends upward (i.e., in FIG. 3, toward the occupant) from the outer rim of the main plate 11 of the retainer 10A. An extension 16A extends laterally (i.e., to the side of the airbag system 1A, or in the direction perpendicular to the direction in which the airbag system 1A retracts (vertically in FIG. 3)) from the distal end of the enclosure 15A in the standing direction. In this second embodiment of the invention, the extension 16A serves as a first contact member of the horn switch device 70A.

The module cover 40A has a main surface 41 that faces the occupant and a leg 42A extending downward in FIG. 3 (i.e., in the direction opposite to the occupant) along the inner wall of the enclosure 15A from the back of the main surface 41. The leg 42A is fixed to the enclosure 15A with a fixing member (not shown) such as a rivet.

In this embodiment, airbag-system supporting pieces 104 stand from the base 101 of the steering wheel 100A along the outer wall of the enclosure 15A. The supporting pieces 104 are provided in a number equal to the number of extensions 16A, and are disposed such that the respective ends face the extensions 16A from below. At the end of each supporting piece 104 is provided a facing part 105 that extends to the side of the airbag system 1A (in parallel with the direction in which the extension 16A extends) and faces the lower surface of the extension 16A. In this embodiment, the facing part 105 is an unmoving body. To the facing part 105, a nut 106 for fixing a guide shaft is fixed.

In this embodiment, a planar second contact member 72 is disposed below each extension 16A via an electrically insulating spacer 74. The distal ends of the extension 16A (first contact member) and the second contact member 72 overhang outward by an equal distance from the spacer 74.

The extension 16A (first contact member) and second contact member 72 have guide-shaft insertion holes 71a' and 72a, respectively. The guide shaft 50 passes through the insertion holes 71a' and 72a.

The lower end of the guide shaft 50 is screwed into the nut 106 at the facing part 105 to be fixed to the facing part 105 and extends upward from the facing part 105. Also in this embodiment, a flange 51 is provided as a stopper at the upper end of the guide shaft 50. Between the flange 51 and the extension 16A is interposed an electrically insulating washer 76 made of rubber or the like. A coil spring 90 is provided between the second contact member 72 and the facing part 105 while having a reserve of energy. The biasing force of the coil spring 90 pushes the washer 76, the extension 16A (the first contact member), the spacer 74, and the second contact member 72 against the flange 51.

In this embodiment, first and second contacts 81 and 82 are provided on the opposing faces of the distal ends of the extension 16A (the first contact member) and the second contact member 72, respectively. Between the distal ends of the extension 16A (the first contact member) and the second contact member 72 is interposed a spring 83.

The distal end of the facing part 105 rises upward (i.e., toward the occupant) and serves as a contacting body 107. The upper end of the contacting body 107 faces the distal end of the second contact member 72 from below. At the upper end of the contacting body 107, a cushion 108 made of rubber, synthetic resin, or the like is provided.

The other structures of the airbag system 1A and the horn switch device 70A are the same as those of the airbag system 1 and the horn switch device 70 of FIGS. 1 and 2(a) and 2(b). The same numerals of FIGS. 3 and 4(a) and 4(b) as those of FIGS. 1 and 2(a) and 2(b) indicate the same components.

The horn-sounding action of the steering wheel 100A equipped with the airbag system 1A having this horn switch device 70A will be described.

As shown in FIG. 4(a), before the module cover 40A is depressed, the second contact member 72 is apart from the contacting body 107, and the extension 16A (the first contact member) and the second contact member 72 extend substantially in parallel, so that the contacts 81 and 82 are open. The second contact member 72 is pushed against the extension 16A (the first contact member) via the spacer 74 by the coil spring 90.

When the module cover 40A is depressed, the entire airbag system 1A moves downward. Along with that, the extension 16A (the first contact member), the second contact member 72, and the spacer 74 fall together along the guide shaft 50. With the falling, the coil spring 90 is compressed.

The facing part 105 (the supporting piece 104) is integrated with the steering wheel 100A, so that it is not displaced even if the module cover 40A is depressed. Also the guide shaft 50 fixed to the facing part 105 is not displaced.

As the extension 16A (the first contact member), the second contact member 72, and the spacer 74 are pushed downward, the distal end of the second contact member 72 comes into contact with the contacting body 107 to be deformed such that it comes close to the extension 16A (the first contact member), thus bringing the contacts 81 and 82 into contact with each other. Thus, the horn switch device 70A is turned on to sound the horn.

On release from the module cover 40A, the extension 16A (the first contact member), the second contact member 72, and the spacer 74 are pushed up by the repulsive force of the coil spring 90, so that the entire airbag system 1A returns to the state shown in FIG. 3. The distal ends of the extension 16A (the first contact member) and the second contact member 72 are pushed open by the repulsive force of the spring 83. This opens the contacts 81 and 82 to stop sounding the horn.

Also in this horn switch device 70A, both of the extension 16A (the first contact member) and the second contact member 72 are integrated with or supported by the airbag system 1A, so that they can be positioned easily and accurately. This reduces the difficulty in assembling the horn switch device 70A or the airbag system 1A.

While the foregoing embodiments are constructed such that when the module cover is depressed, the second contact member comes into contact with the contacting body so as to be deformed, bringing the first and second contacts into contact with each other, the invention is not necessarily limited to these configurations.

For example, in a third embodiment of the invention, it is also possible that the distal end of the first contact member extends laterally longer than the second contact member, the contacting body is disposed below the distal end of the first contact member, and the first and second contact members are in elastic contact with each other so that, when the module cover is depressed, the contacting body pushes up the distal end of the first contact member to separate the contacts from each other. In this case, the horn control circuit is constructed not to energize the horn when the contacts are in close position.

Figure 5:
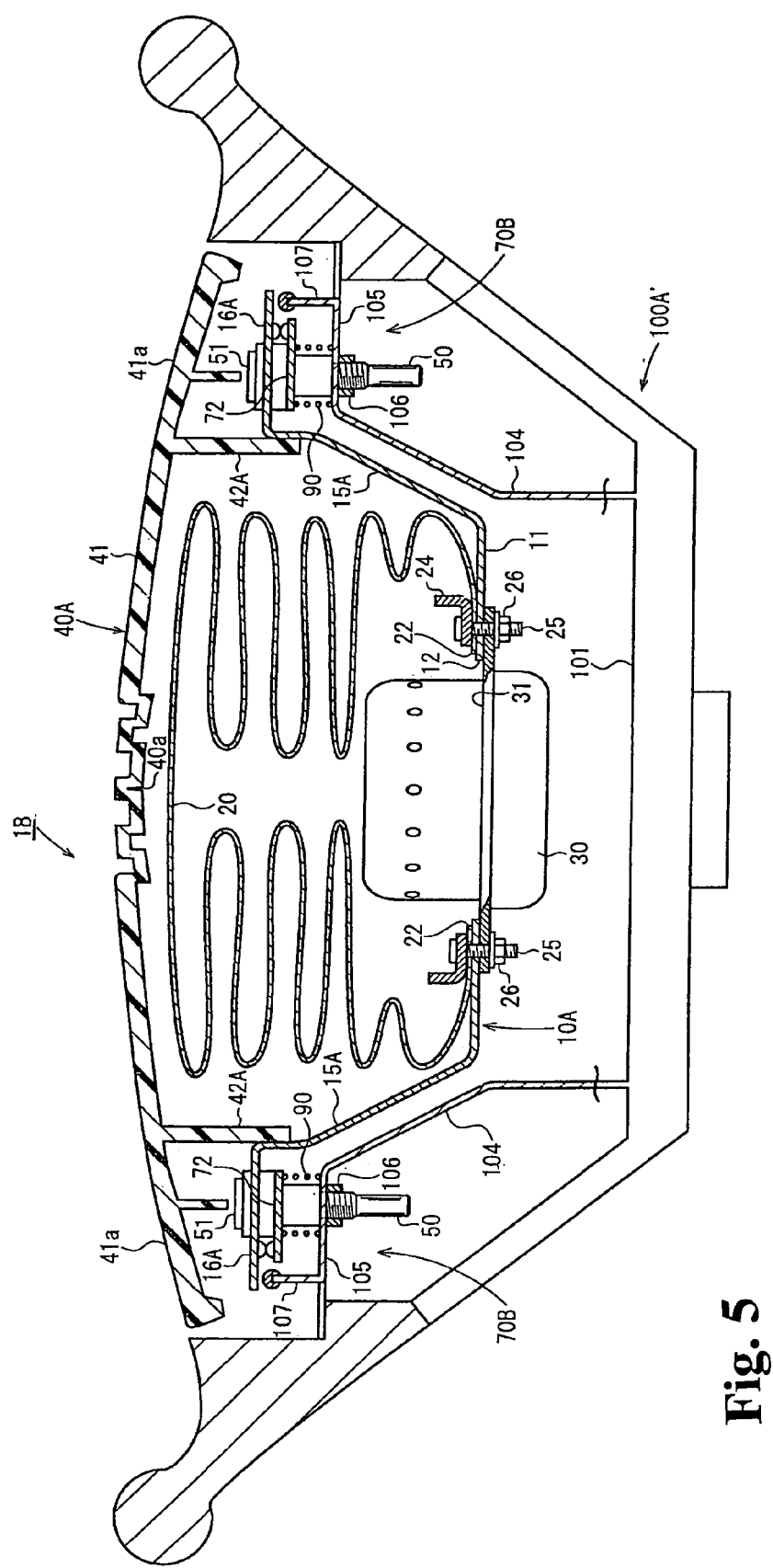
FIG. 5 is a cross-sectional view of a steering wheel equipped with an airbag system including a horn switch device according to still another embodiment of the present invention.
Figure 6A:
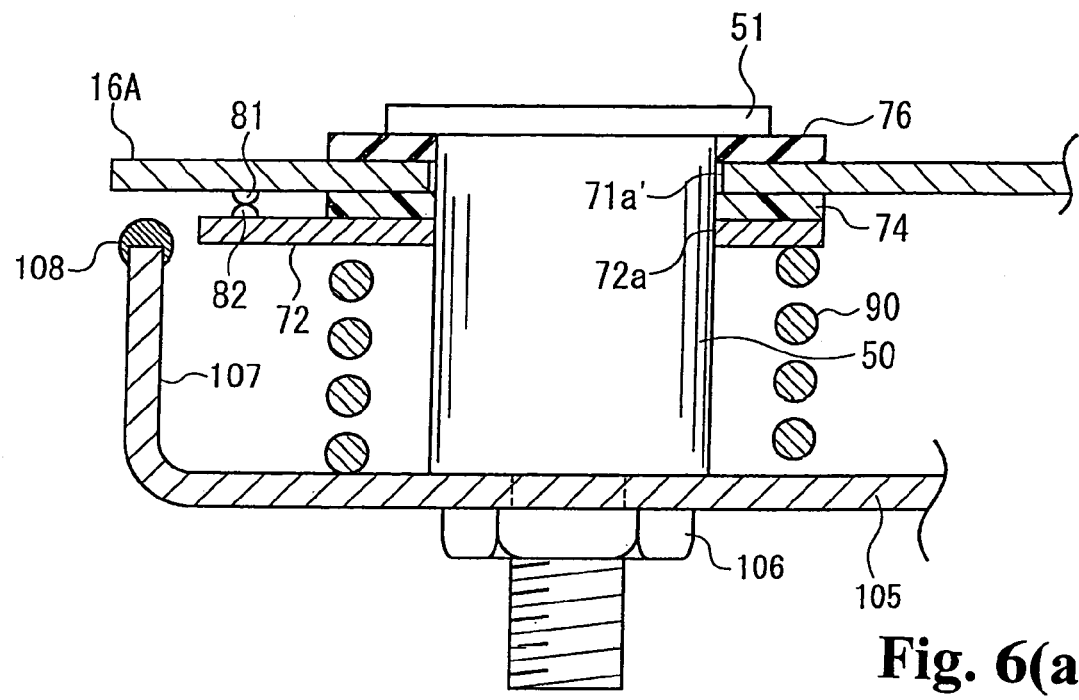
FIGS. 6(a) and 6(b) are cross-sectional views of the horn switch device illustrated in FIG. 5.
Figure 6B:
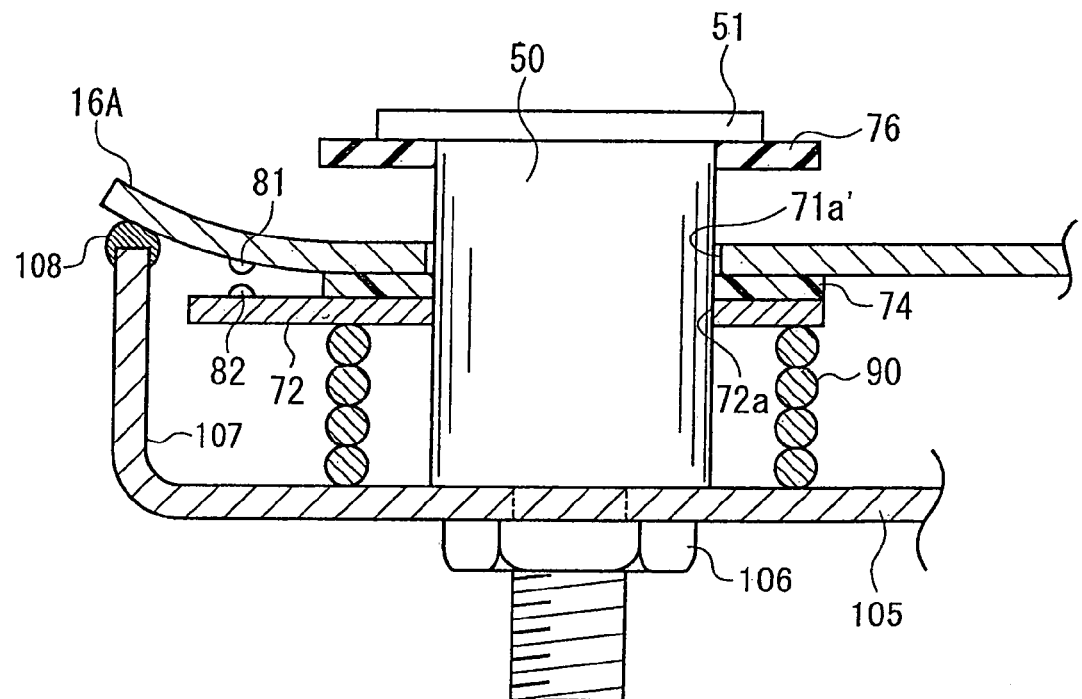

FIG. 5 is a cross-sectional view of a steering wheel 100A' equipped with an airbag system 1B including a horn switch device 70B with a structure according to the third embodiment of the invention. FIGS. 6(a) and 6(b) are enlarged views of the horn switch in FIG. 5. FIG. 6(a) shows "an undepressed" state in which a module cover is not depressed, and FIG. 6(b) shows "a module-cover depressed state" in which the module cover is depressed to sound a horn.

Also in this embodiment, as in the embodiment of FIGS. 3 and 4(a) and 4(b), the entire airbag system 1B constructs a retractable body.

The steering wheel 100A' equipped with the airbag system 1B including the horn switch device 70B is constructed such that, in the steering wheel 100A equipped with the airbag system 1A including the horn switch device 70A in FIGS. 3 and 4(a), 4(b), the distal end of the extension 16A (the first contact member) extends laterally longer than the second contact member 72, the contacting body 107 is disposed below the distal end of the extension 16A (the first contact member), and the first and second contacts 81 and 82 are in elastic contact with each other so that, when the module cover 40A is depressed, the contacting body 107 pushes up the distal end of the extension 16A (the first contact member) to separate the contacts 81 and 82 from each other. In this embodiment, the horn control circuit is constructed so as to not energize the horn when the contacts 81 and 82 are in close position.

The other structures of the airbag system 1B, the horn switch device 70B, and the steering wheel 100A' are the same as those of the airbag system 1A and the horn switch device 70A of FIGS. 3 and 4(a) and 4(b).

The horn-sounding action of the steering wheel 100A' equipped with the airbag system 1B having this horn switch device 70B will be described.

As shown in FIG. 6(a), before the module cover 40A is depressed, the contacting body 107 is apart from the extension 16A (the first contact member), and the extension 16A (the first contact member) and the second contact member 72 bring the contacts 81 and 82 into elastic contact with each other.

When the module cover 40A is depressed, the entire airbag system 1B moves downward. Along with that, the extension 16A (the first contact member), the second contact member 72, and the spacer 74 fall together along the guide shaft 50.

As the extension 16A (the first contact member), the second contact member 72, and the spacer 74 are pushed downward, the distal end of the extension 16A (the first contact member) comes into contact with the contacting body 107 to be deformed such that it comes apart from the second contact member 72, thus separating the contacts 81 and 82 from each other. Thus, the horn switch device 70B is turned on to sound the horn.

On release from the module cover 40A, the extension 16A (the first contact member), the second contact member 72, and the spacer 74 are pushed up by the repulsive force of the coil spring 90, so that the entire airbag system 1B returns to the state shown in FIG. 5. At that time, the contacting body 107 comes apart from the extension 16A (the first contact member) to release the upward deformation of the extension 16A (the first contact member). This brings the extension 16A (the first contact member) and the second contact member 72 close to each other to bring the contacts 81 and 82 into contact with each other, thereby stopping the sounding of the horn.

In a fourth embodiment of the invention (not illustrated), to construct the airbag system 1 and the horn switch device 70 in FIGS. 1 and 2(a) and 2(b) to sound the horn when the contacts are in the open position, the distal end of the first contact member 71 is extended laterally longer than the second contact member 72, the contacting body 85 is disposed below the distal end of the first contact member 71, and the first and second contacts 81 and 82 are placed in elastic contact with each other so that, when the module cover 40 is depressed, the contacting body 85 pushes up the distal end of the first contact member 71 to separate the contacts 81 and 82 from each other.

In the aforementioned embodiments, a pair of contact members is provided on the retractable body while the contacting body with respect to the contact members is provided on the unmoving body. In an embodiment of the present invention, a pair of contact members may be provided on the unmoving body while a contacting body is provided on the retractable body.

Figure 7:
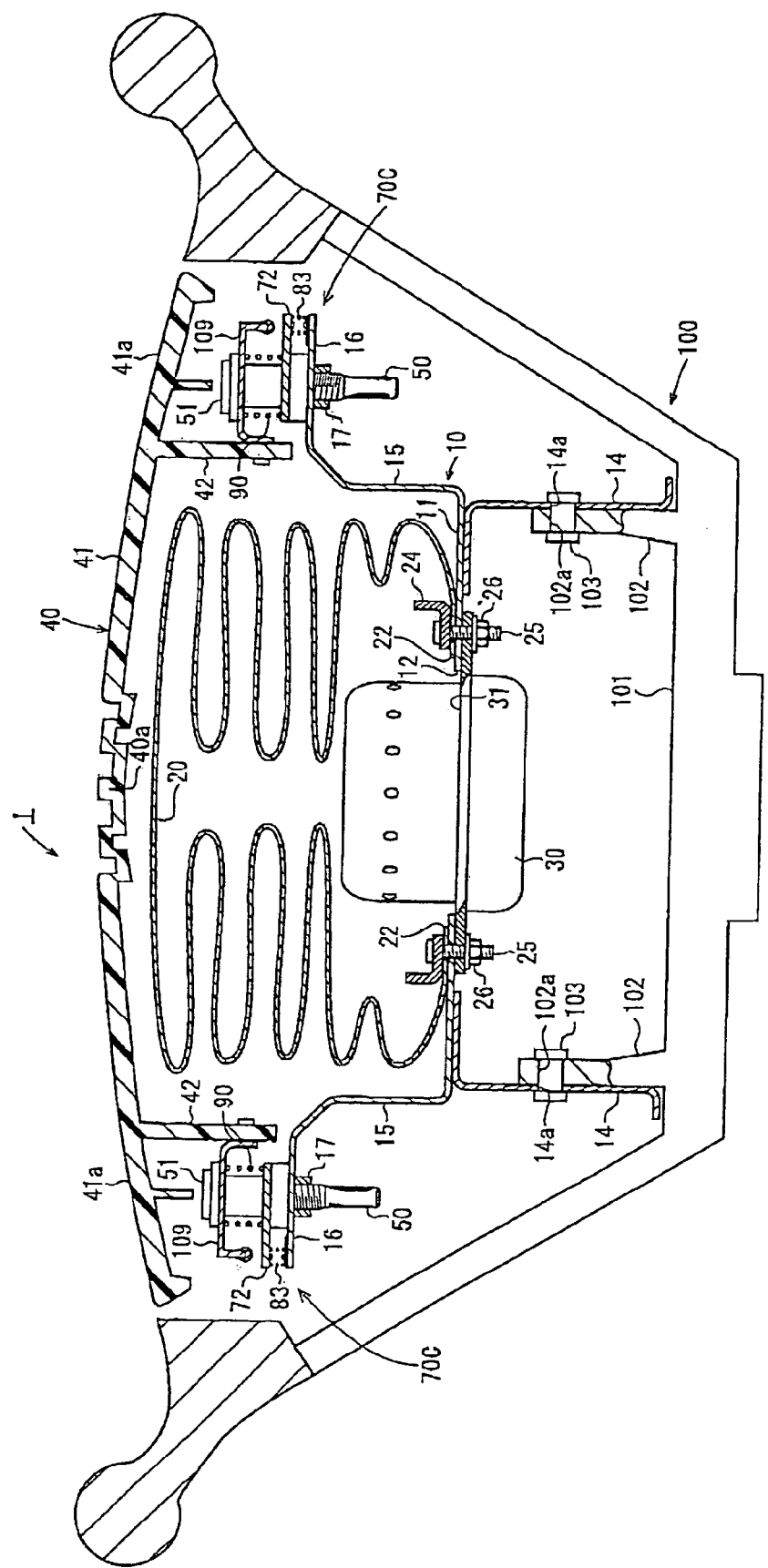
FIG. 7 is a cross-sectional view of a steering wheel equipped with an airbag system including a horn switch device according to still another embodiment of the present invention.
Figure 8A:
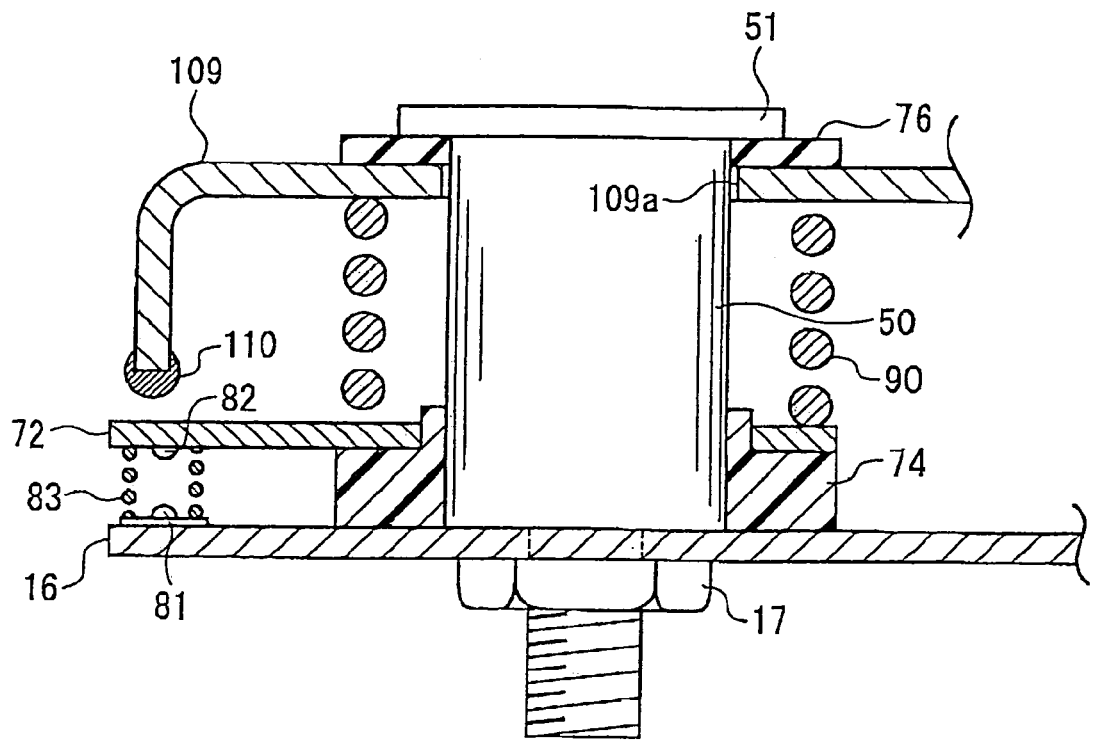
FIGS. 8(a) and 8(b) are cross-sectional views of the horn switch device illustrated in FIG. 7.
Figure 8B:
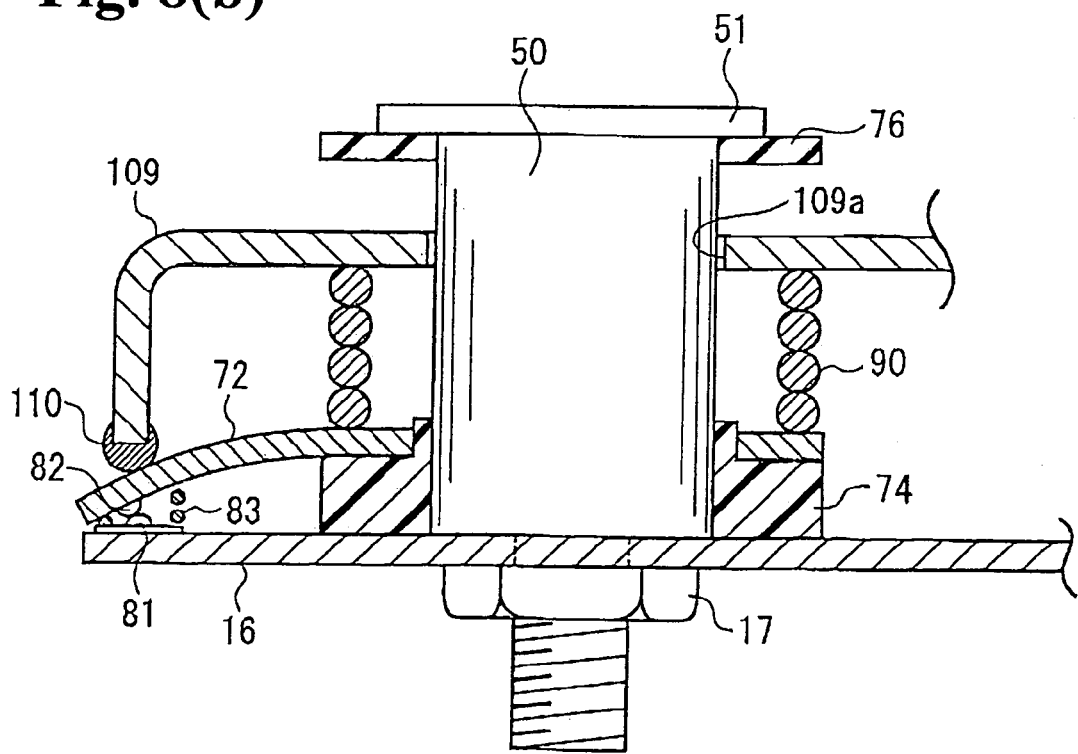

FIG. 7 is a cross-sectional view of a steering wheel 100 equipped with an airbag system 1 including a horn switch device 70C with such a structure. FIGS. 8(a) and 8(b) are enlarged cross-sectional views of a vicinity of the horn switch device 70C. FIG. 8(a) shows an undepressed state in which a module cover is not depressed, and FIG. 8(b) shows a module-cover depressed state in which the module cover is depressed to sound a horn.

The horn switch device 70C has such a structure that, in the embodiment shown in FIGS. 1, 2(a) and 2(b), a pair of contact members is provided on the side of an extension 16 of a retainer 10 which serves as the unmoving body, and a contacting body with respect to the contact members is disposed on the side of a module cover 40 which serves as the retractable body.

Specifically, in this embodiment of the present invention, the extension 16 is a first contact member and a planer second contact member 72 is disposed on the extension 16 via an electrically insulating spacer 74. The distal ends of the extension 16 and the second contact member 72 overhang outward from the spacer 74. Contacts 81 and 82 are provided on the opposing faces of the extension 16 and the second contact member 72, respectively. A spring 83 is interposed between the distal ends of the extension 16 and the second contact member 72.

A contacting body 109 is mounted to a leg 42 of the module cover 40 so as to face the upper surface of the second contact member 72. The contacting body 109 has such a structure that the distal end portion of the first contact member 71 in the embodiment shown FIGS. 1, 2(a) and 2(b) is bent downward (toward the second contact member 72). The tip end of the bent portion of the contacting body 109 has a cushion 110 made of rubber, synthetic resin, or the like.

In this embodiment, a guide shaft 50 extends from the extension 16 and passes through a guide-shaft insertion opening 109a in the contacting body 109. An electrically insulating washer 76 is interposed between a flange 51 as a stopper at the upper end of the guide shaft 50 and the contacting body 109.

A coil spring 90 is provided between the contacting body 109 and the second contact member 72 while storing an energy. The biasing force of the coil spring 90 pushes the contacting body 109 and the washer 76 against the flange 51 of the guide shaft 50 and pushes the second contact member 72 and the spacer 74 against the extension 16.

The guide shaft 50 including the flange 51, the contacting body 109, the second contact member 72 and the extension 16 are insulated from each other via the spacer 74 and the washer 76 or by being arranged not to contact with each other.

The other structures of the horn switch device 70C and the steering wheel 100 equipped with the airbag system 1 including the horn switch device 70C are the same as those of the horn switch device 70 and the steering wheel 100 equipped with the airbag system 1 including the horn switch device 70 of FIGS. 1, 2(a) and 2(b). The same numerals of FIGS. 7, 8(a) and 8(b) as those of FIGS. 1, 2(a) and 2(b) indicate the same components.

The horn-sounding action of the steering wheel 100 equipped with the airbag system 1 having this horn switch device 70C will be described.

As shown in FIG. 8(a), before the module cover 40 is depressed, the contacting body 109 is spaced apart from the second contact member 72, and the second contact member 72 and the extension 16 extend substantially in parallel, so that the contacts 81 and 82 are open.

When the module cover 40 is depressed, the contacting body 109 descends together with the module cover 40.

The extension 16 extends from the retainer 10 fixed to the steering wheel 100, so that it is not displaced even if the module cover 40 is depressed. Accordingly, the second contact member 72 disposed on the extension 16 is not displaced.

As the contacting body 109 is pushed downward, the contacting body 109 comes to contact with the second contact member 72 to deform the distal end of the contact member 72 so as to come close to the extension 16 as shown in FIG. 8(b). Thus, the contacts 81 and 82 are brought into contact with each other, thereby turning on the horn switch device 70C to sound a horn.

On release from the module cover 40, the contacting body 109 and the module cover 40 are pushed up by the counter force of the coil spring 90 to the state shown in FIG. 8(a). The distal end of the second contact member 72 is pushed up by the counter force of the spring 83. This opens the contacts 81 and 82 to stop sounding of the horn.

In this horn switch device 70C, the extension 16 which is the unmoving body serves as the first contact member and the second contact member 72 is supported on the extension 16, so that they can be positioned easily and accurately. This reduces the difficulty in assembling the horn switch device 70C or the airbag system 1.

The embodiment illustrated in FIGS. 7, 8(*a*) and 8(*b*) has a structure in which only the module cover is retracted by depression in the embodiment of FIGS. 1, 2(*a*) and 2(*b*), a pair of the contact members is provided on the side of the unmoving body, and the contacting body with respect to the contact members is provided on the side of the retractable body. The structure can also be applied to the embodiment illustrated in FIGS. 3, 4(*a*) and 4(*b*) in which the entire airbag system moves when the module cover is depressed.

Figure 9:
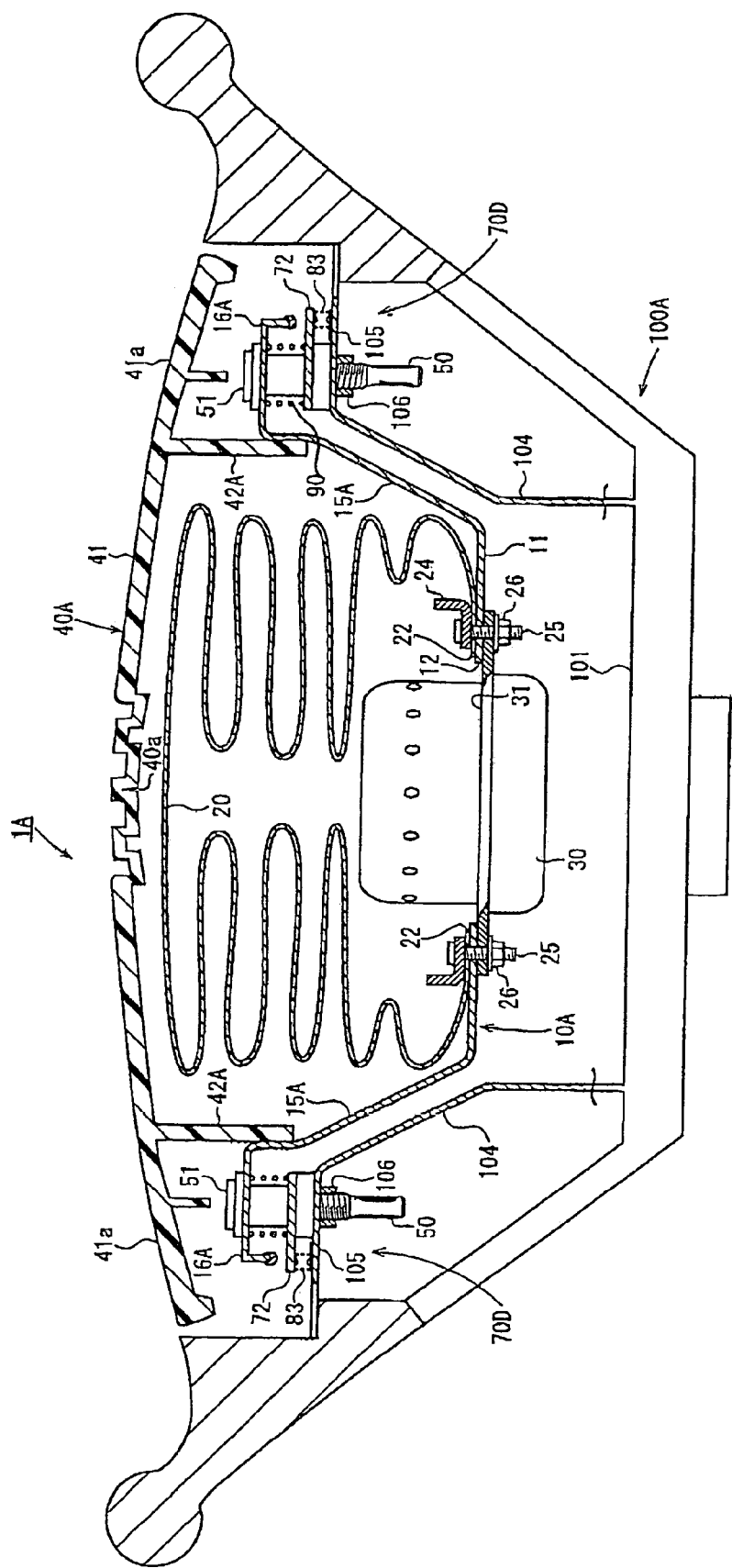
FIG. 9 is a cross-sectional view of a steering wheel equipped with an airbag system including a horn switch device according to still another embodiment of the present invention.

FIG. 9 is a cross-sectional view of a steering wheel 100A equipped with an airbag system 1A including a horn switch device 70D with such a structure.

The horn switch device 70D is constructed such that in the embodiment shown in FIGS. 3, 4(*a*) and 4(*b*), a pair of contact members is provided on the side of a facing part 105 of an airbag-system supporting piece 104 which serves as the unmoving body, and a contacting body with respect to the contact members is disposed on the side of an extension 16A of a retainer 10A which serves as the retractable body.

Specifically, in this embodiment of the present invention, the facing part 105 forms a first contact member and a planer second contact member 72 is disposed on the facing part 105 via an electrically insulating spacer (the reference numeral is omitted). The distal ends of the facing part 105 and the second contact member 72 overhang outward from the spacer. Contacts (the reference numerals are omitted) are provided on the opposing faces of the facing part 105 and the second contact member 72, respectively. A spring 83 is interposed between the distal ends of the facing part 105 and the second contact member 72.

In this embodiment of the present invention, a contacting body (the reference numeral is omitted) has such a structure that the distal end portion of the extension 16A of a retainer 10A is bent downward (toward the second contact member 72). The tip end of the bent portion of the extension 16A has a cushion 110 made of rubber, synthetic resin, or the like.

A coil spring 90 is provided between the extension 16A and the second contact member 72 while storing an energy. The biasing force of the coil spring 90 pushes the extension 16A against the flange 51 of the guide shaft 50 and pushes the second contact member 72 and the spacer against the facing part 105.

The other structures of the horn switch device 70D and the steering wheel 100A equipped with the airbag system 1A including the horn switch device 70D are the same as those of the horn switch device 70A and the steering wheel 100A equipped with the airbag system 1A including the horn switch device 70A of FIGS. 3, 4(*a*) and 4(*b*). The same numerals of FIG. 9 as those of FIGS. 3, 4(*a*) and 4(*b*) indicate the same components.

In the horn switch device 70D, when the module cover 40A is depressed, the entire airbag system 1A is retracted. Along with that, the extension 16A as the contacting body descends and pushes the second contact member 72, so that the second contact member 72 comes close to the facing part 105 as the first contact member. Except this operation, the horn-sounding action of the horn switch device 70D is the same as that of the embodiment shown in FIGS. 7, 8(*a*) and 8(*b*).

The embodiments illustrated in FIGS. 7, 8(*a*), 8(*b*) and 9 have such a structure that, in the embodiments of FIGS. 1 to 4(*a*) and 4(*b*) in which the contacts come to contact with each other to sound a horn, a pair of contact members is provided on the side of the unmoving body and the contacting body with respect to the contact members is provided on the side of the retractable body. It is also possible that, in the embodiment of FIGS. 5, 6(*a*) and 6(*b*) in which the horn switch is in an off state when the contacts are contacting with each other while the contacts come apart from each other to be turned on to sound a horn, a pair of contact members is provided on the side of the unmoving body and a contacting body with respect to the contact members is provided on the side of the retractable body.

Figure 10:
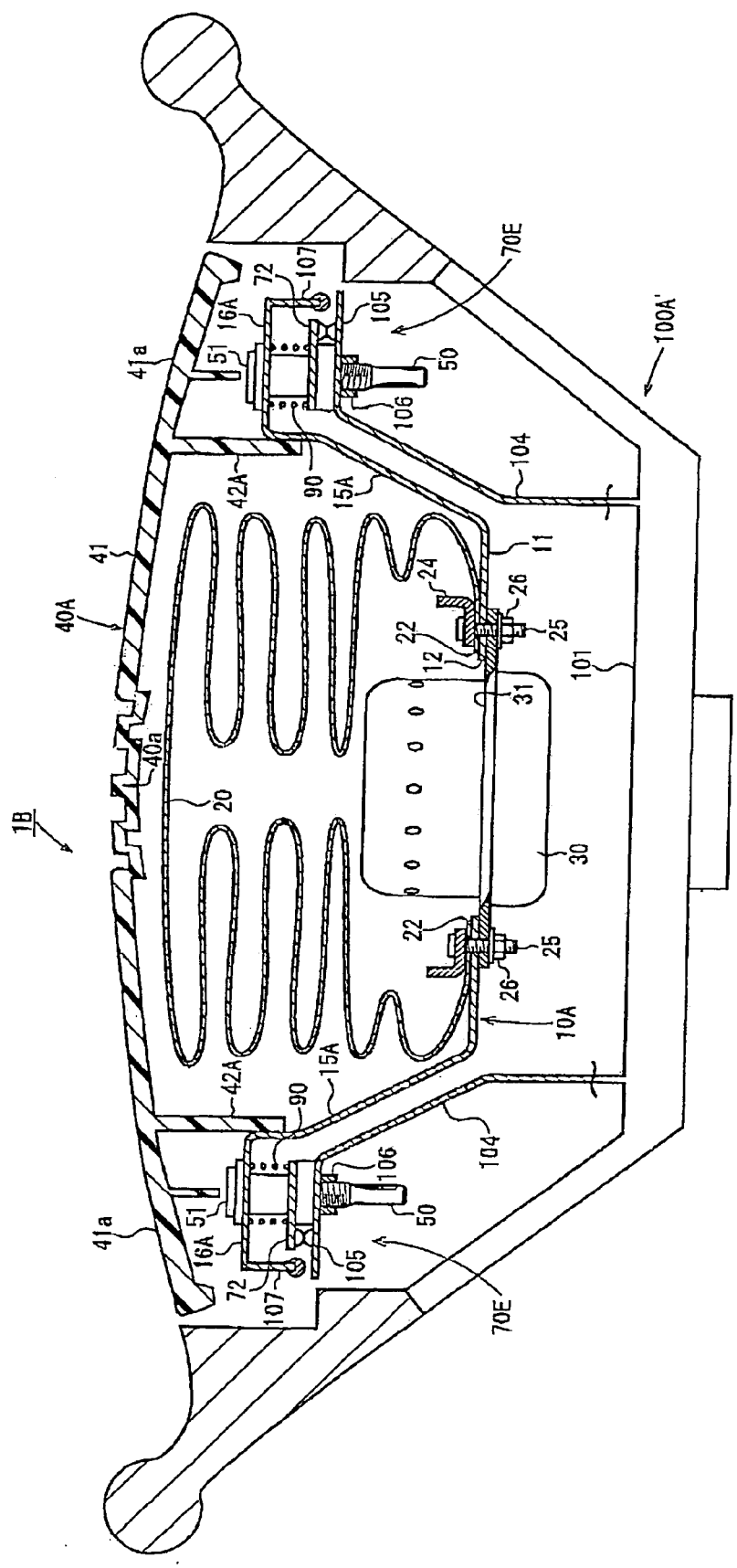
FIG. 10 is a cross-sectional view of a steering wheel equipped with an airbag system including a horn switch device according to still another embodiment of the present invention.

FIG. 10 is a cross-sectional view of a steering wheel 100A' equipped with an airbag system 1B including a horn switch device 70E with such a structure. FIGS. 11(*a*) and 11(*b*) are cross-sectional views of a vicinity of the horn switch device 70E. FIG. 11(*a*) shows an undepressed state in which a module cover is not depressed, and FIG. 11(*b*) shows a module-cover depressed state.

The horn switch device 70E has is constructed such that in the embodiment shown in FIGS. 5, 6(*a*) and 6(*b*), a pair of contact members is provided on the side of a facing part 105 of an airbag-system supporting piece 104 which serves as the unmoving body, and a contacting body with respect to the contact members is disposed on the side of an extension 16A of a retainer 10A which serves as the retractable body.

Specifically, in this embodiment of the present invention, the facing part 105 forms a first contact member and a planer second contact member 72 is disposed on the facing part 105 via an electrically insulating spacer 74. Contacts 81 and 82 are provided on the opposing faces of the facing part 105 and the second contact member 72, respectively, and are placed in elastic contact with each other. The distal end of the facing part 105 extends outward from the distal end of the second contact member 72.

In this embodiment of the present invention, the distal end portion of the extension 16A of a retainer 10A is bent downward (toward the distal end of the facing part 105) and serves as a contacting body 107 with respect to the facing part 105. The tip end of the contacting body 107 has a cushion 108 made of rubber, synthetic resin, or the like.

A coil spring 90 is provided between the extension 16A and the second contact member 72 while storing an energy. The biasing force of the coil spring 90 pushes the extension 16A against the flange 51 of the guide shaft 50 and pushes the second contact member 72 against the facing part 105.

The other structures of the horn switch device 70E and the steering wheel 100A' equipped with the airbag system 1B including the horn switch device 70E are the same as those of the horn switch device 70B and the steering wheel 100A' equipped with the airbag system 1B including the horn switch device 70B of FIGS. 5, 6(*a*) and 6(*b*). The same numerals of FIGS. 10, 11(*a*) and 11(*b*) as those of FIGS. 5, 6(*a*) and 6(*b*) indicate the same components.

The horn-sounding action of the steering wheel 100A' equipped with the airbag system 1B having this horn switch device 70E will be described.

As shown in FIG. 11(*a*), before the module cover 40A is depressed, the contacting body 107 is spaced apart from the second facing part 105 (the first contact member), and the contact 81 of the facing part 105 and the contact 82 of the second contact member 72 are placed in elastic contact with each other.

When the module cover 40A is depressed, the entire airbag system 1B moves downward, and the extension 16A descends along with the airbag system 1B.

Figure 11A:
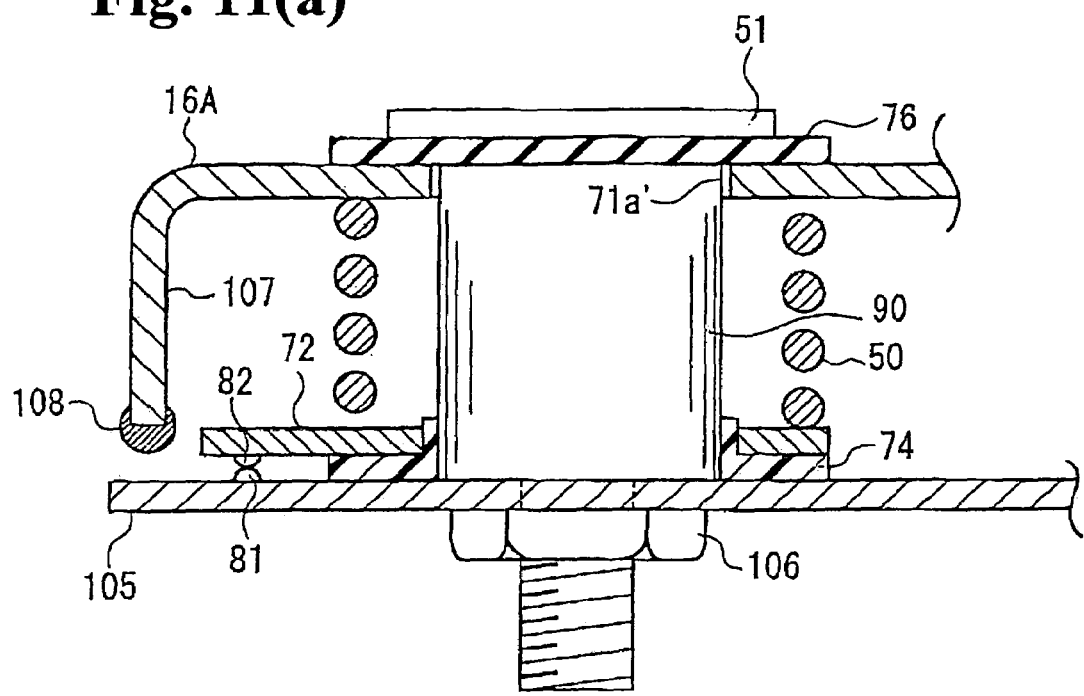
FIGS. 11(a) and 11(b) are cross-sectional views of the horn switch device illustrated in FIG. 10.
Figure 11B:
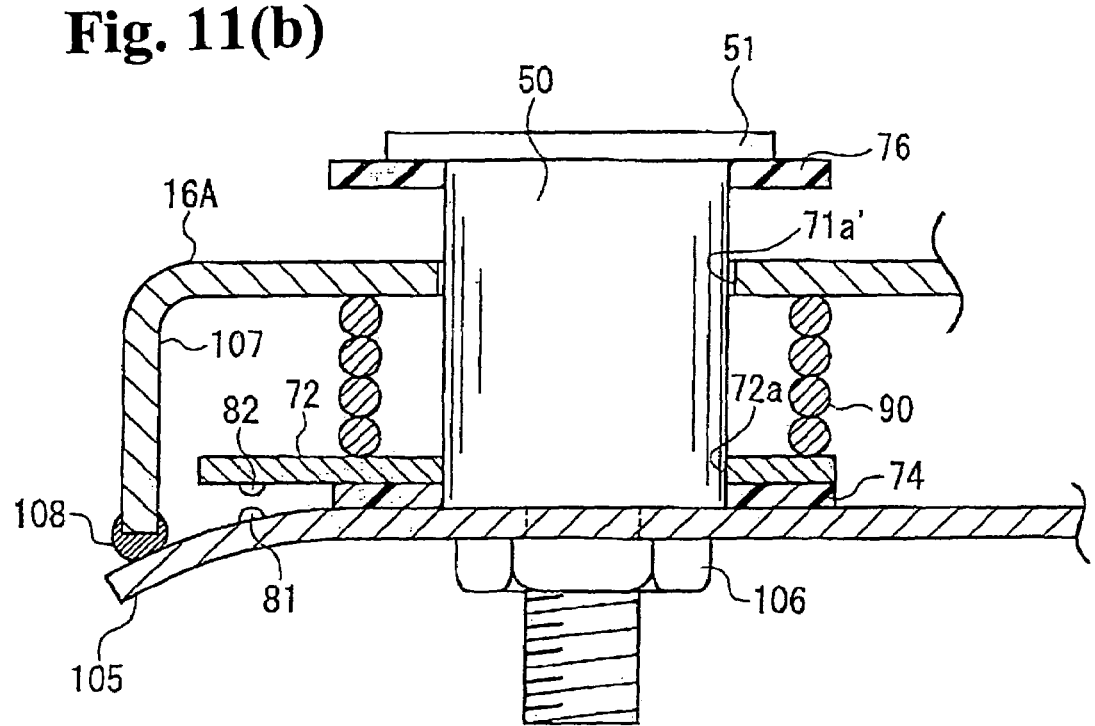

As the extension 16A is pushed downward, the contacting body 107 comes into contact with the distal end of the facing part 105 to deform the facing part 105 so as to be separated from the second contact member 72 as shown in FIG. 11(b). Thus, the contacts 81 and 82 are spaced apart from each other, thereby turning on the horn switch device 70E to sound a horn.

On release from the module cover 40A, the extension 16A is pushed up by the counter force of the coil spring 90, so that the entire airbag system 1B returns to the state shown in FIG. 11(a). At that time, the contacting body 107 is separated apart from the facing part 105 so as to release the downward deformation of the facing part 105. Thus, the facing part 105 and the second contact member 72 come close to each other to bring the contacts 81 and 82 into contact with each other, thereby stopping sounding of the horn.

Figure 12:
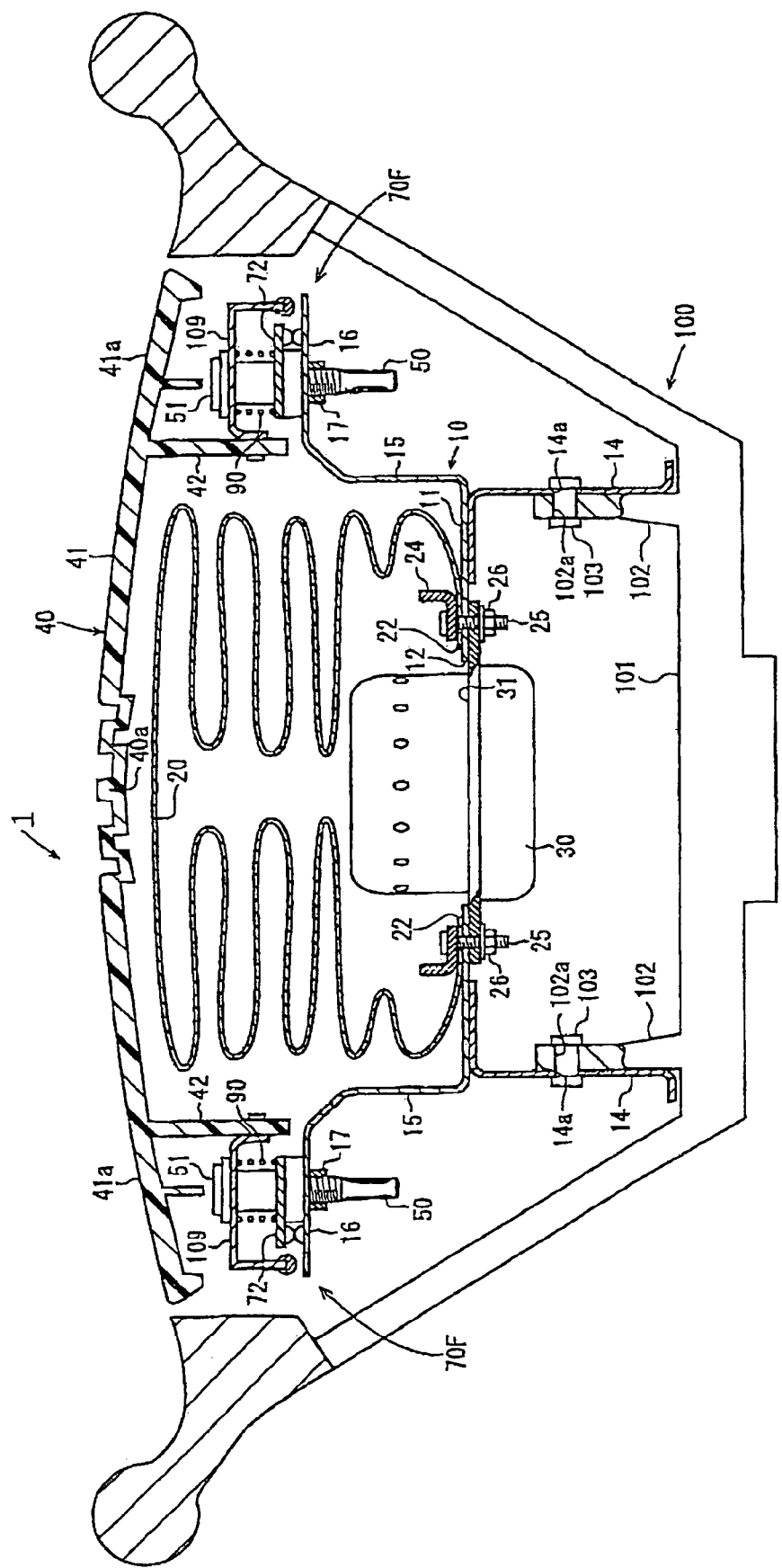
FIG. 12 is a cross-sectional view of a steering wheel equipped with an airbag system including a horn switch device according to still another embodiment of the present invention.

The embodiment in FIGS. 10, 11(a) and 11(b) has a structure in which the entire airbag system 1B retracts along with depression of the module cover 40A. The invention can also be applied to a structure in which only the module cover is retracted by depression. FIG. 12 shows a cross-sectional view of a steering wheel equipped with an airbag system with this structure.

The embodiment of FIG. 12 is constructed such that the steering wheel 100 equipped with the airbag system 1 shown in FIGS. 1, 2(a) and 2(b), in which only the module cover 40 serves as the retractable body, has a horn switch device 70F. The horn switch device 70F is operated such that the horn switch is in an off state when the contacts are contacting with each other, and the contacts come apart from each other to sound a horn. In the horn switch device 70F, a pair of contact members is provided on the side of an extension 16 of a retainer 10 as the unmoving body while the contacting body with respect to the contact members is provided on the side of the module cover 40 as the retractable body.

Specifically, in this embodiment of the present invention, the extension 16 forms a first contact member and a planer second contact member 72 is disposed on the extension 16 via an electrically insulating spacer (the reference numeral is omitted). A pair of contacts (the reference numerals are omitted) is provided on the opposing faces of the extension 16 and the second contact member 72, respectively, and is placed in elastic contact with each other. The distal end of the extension 16 extends outward from the distal end of the second contact member 72.

A contacting body 109 is mounted to a leg 42 of the module cover 40 so as to face the upper surface of the second contact member 72. The contacting body 109 has such a structure that the distal end portion of the first contact member 71 in the embodiment shown FIGS. 1, 2(a) and 2(b) is bent downward (toward the distal end portion of the extension 16). The tip end of the bent portion of the contacting body 109 has a cushion (reference numeral is omitted) made of rubber, synthetic resin, or the like.

A coil spring 90 is provided between the contacting body 109 and the second contact member 72 while storing an energy. The biasing force of the coil spring 90 pushes the contacting body 109 against the flange 51 of the guide shaft 50 and pushes the second contact member 72 against the extension 16.

The other structures of the horn switch device 70F and the steering wheel 100 equipped with the airbag system 1 including the horn switch device 70F are the same as those of the horn switch device 70 and the steering wheel 100 equipped with the airbag system 1 including the horn switch device 70 of FIGS. 1, 2(a) and 2(b). The same numerals of FIG. 12 as those of FIGS. 1, 2(a) and 2(b) indicate the same components.

In the steering wheel 100 equipped with the airbag system 1 including the horn switch 70F with this structure, when the module cover 40 is depressed, only the module cover 40 in the airbag system 1 retracts and the contacting body 109 descends with the module cover 40.

As the contacting body 109 is pushed downward, the contacting body 109 comes into contact with the distal end of the extension 16 to deform the extension 16 so as to be separated from the second contact member 72. Thus, the contacts are spaced apart from each other, thereby turning on the horn switch device 70F to sound a horn.

On release from the module cover 40, the module cover 40 is pushed up via the contacting body 109 by the counter force of the coil spring 90 so as to return to the initial state. At that time, the contacting body 109 is spaced apart from the extension 16 so as to release the downward deformation of the extension 16. Thus, the extension 16 and the second contact member 72 come close to each other to bring the contacts into contact with each other, thereby stopping sounding the horn.

The foregoing embodiments are merely examples of the invention, and the invention is not limited to the embodiments.

The disclosures of Japanese Patent Application Nos. 2004-358574 filed on Dec. 10, 2004; 2005-11773 filed on Jan. 19, 2005; 2005-183677 filed on Jun. 23, 2005; and 2005-340561 filed on Nov. 25, 2005 are incorporated herein.

What is claimed is:

1. A horn switch device comprising:
   a retractable body capable of being retracted by depression;
   an unmoving body facing said retractable body;
   a biasing member interposed between said retractable body and said unmoving body, for biasing said retractable body in a restoring direction;
   a pair of contact members both being attached to one of the retractable body and the unmoving body and extending in a direction substantially perpendicularly to the restoring direction of the retractable body, each having a contact so that said contacts face each other and are capable of contacting each other by movement of said retractable body, and
   a contacting body, formed on the other of the retractable body and the unmoving body, for contacting one of said contact members when said retractable body retracts, so as to deform said contact member toward the other contact member, thereby bringing said contacts into contact with each other.

2. The horn switch device according to claim 1, wherein both of said contact members are attached to said retractable body and move together with said retractable body.

3. The horn switch device according to claim 1, wherein both of said contact members are held by said unmoving body.

4. The horn switch device according to claim 1, wherein said retractable body is a module cover of an airbag system.

5. The horn switch device according to claim 4, wherein said unmoving body is a member extending from a retainer of said airbag system.

6. The horn switch device according to claim 1, wherein said retractable body is an airbag system.

7. The horn switch device according to claim 6, wherein said unmoving body is a steering wheel or a member extending from said steering wheel.

8. An airbag system including a horn switch device, wherein said horn switch device is the horn switch device according to claim 1.

9. A steering wheel equipped with an airbag system including a horn switch device, wherein said airbag system is the airbag system according to claim 8.

10. A steering wheel including a horn switch, wherein said horn switch is the horn switch device according to claim 1.

11. The horn switch device according to claim 1, further comprising a guide shaft passing through the contact members to allow the contact members to move along the guide shaft, and a spacer situated around the guide shaft and interposed between the contact members.

12. The horn switch device according to claim 11, wherein said contact members have a plate shape extending substantially parallel to each other with the contacts thereon.

13. The horn switch device according to claim 12, further comprising a spring situated between the contact members to urge the contacts in a direction away from each other.

14. A horn switch device comprising:
- a retractable body capable of being retracted by depression;
- an unmoving body facing said retractable body;
- a biasing member interposed between said retractable body and said unmoving body, for biasing said retractable body in a restoring direction;
- a pair of contact members both being attached to one of the retractable body and the unmoving body and extending in a direction substantially perpendicularly to the restoring direction of the retractable body, each having a contact so that said contacts face and contact with each other when said retractable body is in a restored position, and said contacts are capable of separating from each other by movement of said retractable body; and
- a contacting body, formed on the other of the retractable body and the unmoving body, for contacting one of said contact members when said retractable body retracts so that when said retractable body retracts, said contacting body deforms one contact member so as to separate said one contact member from the other contact member, thereby separating said contacts from each other.

15. The horn switch according to claim 14, wherein both of said contact members are attached to said retractable body and move together with said retractable body.

16. The horn switch device according to claim 14, wherein both of said contact members are held by said unmoving body.

17. The horn switch device according to claim 14, further comprising a guide shaft passing through the contact members to allow the contact members to move along the guide shaft, and a spacer situated around the guide shaft and interposed between the contact members.

18. The horn switch device according to claim 17, wherein said contact members have a plate shape extending substantially parallel to each other with the contacts thereon.

* * * * *